United States Patent [19]

Choi

[11] Patent Number: 5,615,197
[45] Date of Patent: Mar. 25, 1997

[54] DISC PLAYER FOR REPRODUCING BOTH MINIDISC AND A COMPACT DISC

[75] Inventor: Youngsuk Choi, Seoul, Rep. of Korea

[73] Assignee: Daewoo Electronics Co., Ltd., Seoul, Rep. of Korea

[21] Appl. No.: 363,811

[22] Filed: Dec. 27, 1994

[30] Foreign Application Priority Data

Dec. 28, 1993 [KR] Rep. of Korea .............. 93-30144

[51] Int. Cl.⁶ .................. G11B 33/02; G11B 7/04
[52] U.S. Cl. ............ 369/77.2; 369/75.2; 369/75.1; 369/77.1; 360/99.06
[58] Field of Search ............ 369/77.2, 75.2, 369/36, 77.1, 291; 360/133, 99.06

[56] References Cited

U.S. PATENT DOCUMENTS

| | | | |
|---|---|---|---|
| 4,893,295 | 1/1990 | Matsuura et al. | 369/75.2 |
| 5,299,185 | 3/1994 | Sakurai et al. | 369/75.2 |

FOREIGN PATENT DOCUMENTS 5242579  9/1993  Japan .

Primary Examiner—Stuart S. Levy
Assistant Examiner—Adriana Giordana
Attorney, Agent, or Firm—Oliff & Berridge

[57] ABSTRACT

A disc player for selectively reproducing both a minidisc and a compact disc, comprises a combined disc tray composed of a minidisc tray and a compact disc tray, wherein the minidisc tray and compact disc tray are arranged vertically separated. The compact disc tray in which a compact disc mount is formed constitutes an upper plate of the combined disc tray, and the minidisc tray in which a minidisc mount is formed constitutes a lower plate of the combined disc tray, with the compact disc mount and minidisc mount vertically aligned with each other. A single assembly having a turntable on which a compact disc and a minidisc can be loaded in an alternative manner has a minidisc loading body for loading a minidisc cartridge thereon and a compact disc loading body disposed under the minidisc loading body to load a compact disc thereon. The minidisc loading body has a smaller diameter than that of the compact disc loading body.

16 Claims, 7 Drawing Sheets

DISC PLAYER FOR REPRODUCING BOTH MINIDISC AND A COMPACT DISC

BACKGROUND OF THE INVENTION

1. Field of the Invention

The present invention relates to a disc player for reproducing both e minidisc and a compact disc and more particularly, to a disc player for selectively reproducing a minidisc and a compact disc by using a single pickup and a single spindle assembly.

2. Description of the Prior Art

Nowadays, a variety of disc players are used for reproduction of only one kind of disc. So, when a user wants to obtain information from other kinds of discs, e.g., minidisc and compact disc, he or she may be required to buy a new disc player applicable thereto. Also, there have been manufactured disc players which can play discs with different sizes, these may be used only in case of a reproduction of the same kind of disc. Lately, a disc player capable of playing a naked disc such as compact disc as well as a cartridge-encased disc such as minidisc has been proposed. Such player capable of reproducing both naked disc and cartridge-encased disc is disclosed in U.S. Pat. No. 5,299,185.

The disc player disclosed in the above-mentioned U.S. Patent has a drawback in that components for loading and driving of the naked disc and the cartridge-encased disc are very intricately connected thereto, so that the reliability for the entire components may be seriously considered. Due to these many components, the production cost is also increased.

Also, there has been proposed a disc player for selectively reproducing both a minidisc and the compact disc, wherein a first spindle assembly for the compact disc and a second spindle assembly for the minidisc are arranged on a center line of an identical plane of a base plate in separate relationship with each other with a predetermined distance apart, a single pickup is arranged to move linearly between the first and second spindle assemblies in order to read out informations recorded in both a compact disc and a minidisc which are loaded on respective turntables constituting the first and second spindle assemblies, and a disc tray, on an identical plane of which are provided a compact disc mount as well as a minidisc mount in a front and rear relation, is so disposed above the base plate as to move not only in a forward and a backward direction but also in a upward and a downward direction.

This conventional art has advantage in that it is possible to reproduce selectively both the compact disc as well as the minidisc by using a single pickup device. To perform this, however, a pair of spindle assemblies must be arranged longitudinally on an identical plane of the base plate, and the compact disc mount and minidisc mount also must be provided within an identical plane of the disc tray longitudinally. Accordingly, a product becomes very bulky and structure thereof is complicated. So productivity deteriorates and it is impossible to make the product small in size or thin in thickness.

SUMMARY OF THE INVENTION

The present invention aims at solving the aforesaid problems of the conventional art, and it is therefore an object to provide a disc player for reproducing both a minidisc and a compact disc using a single pickup device and a single spindle assembly.

Another object of the present invention is to provide a disc player for selectively reproducing a minidisc as well as a compact disc, wherein a compact disc tray and a minidisc tray can move fast within a tray holder.

To accomplish these objects, according to one aspect of the invention, there is provided a disc player for selectively reproducing a minidisc and a compact disc comprising:

a base plate having a horizontal bottom plate, a first side wall and a second side wall, the walls extending upwardly from both respective side ends of the bottom plate; loading means secured to the base plate for loading a minidisc or a compact disc; a tray holder movably disposed within the base plate; a moving plate engaged with the loading means so as to move the tray holder in a loading direction and an ejecting direction of the disc; a combined disc tray composed of a compact disc tray and a minidisc tray and movably disposed within the base plate, the compact disc tray and minidisc tray being arranged vertically apart from each other; a disc tray feeding means for feeding the combined disc tray in a forward direction and a backward direction, the disc tray feeding means being secured to the tray holder; a power transmitting plate engaged with the disc tray feeding means; and a single spindle assembly having a turntable on which a compact disc and a minidisc can be selectively loaded.

According to another aspect of the invention, there is provided a means for feeding the combined disc tray with high speed, the means for feeding the combined disc tray comprising:

a guide rack formed longitudinally on an inner surface of the tray holder; and a double helical gear rotatably secured to a shaft fixed to the compact disc tray and meshed with the guide rack.

BRIEF DESCRIPTION OF THE DRAWINGS

The above objects and other advantages of the present invention will become more apparent by describing in detail a preferred embodiment thereof with reference to the attached drawings in which.

DESCRIPTION OF THE PREFERRED EMBODIMENT

Figure 1:
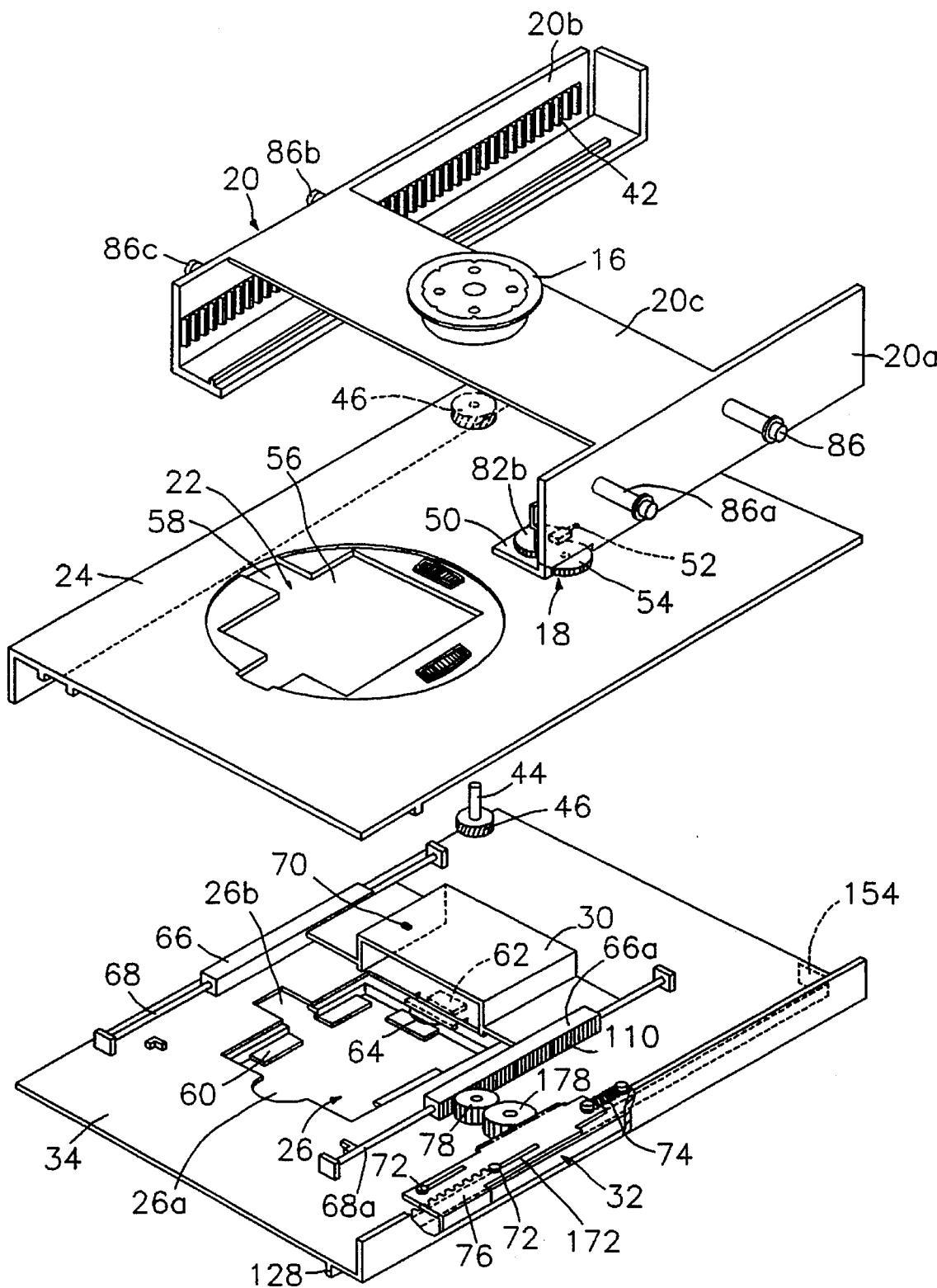
FIG. 1 is an exploded perspective view of a tray holder, a compact disc tray and a minidisc tray according to the present invention.
Figure 2:
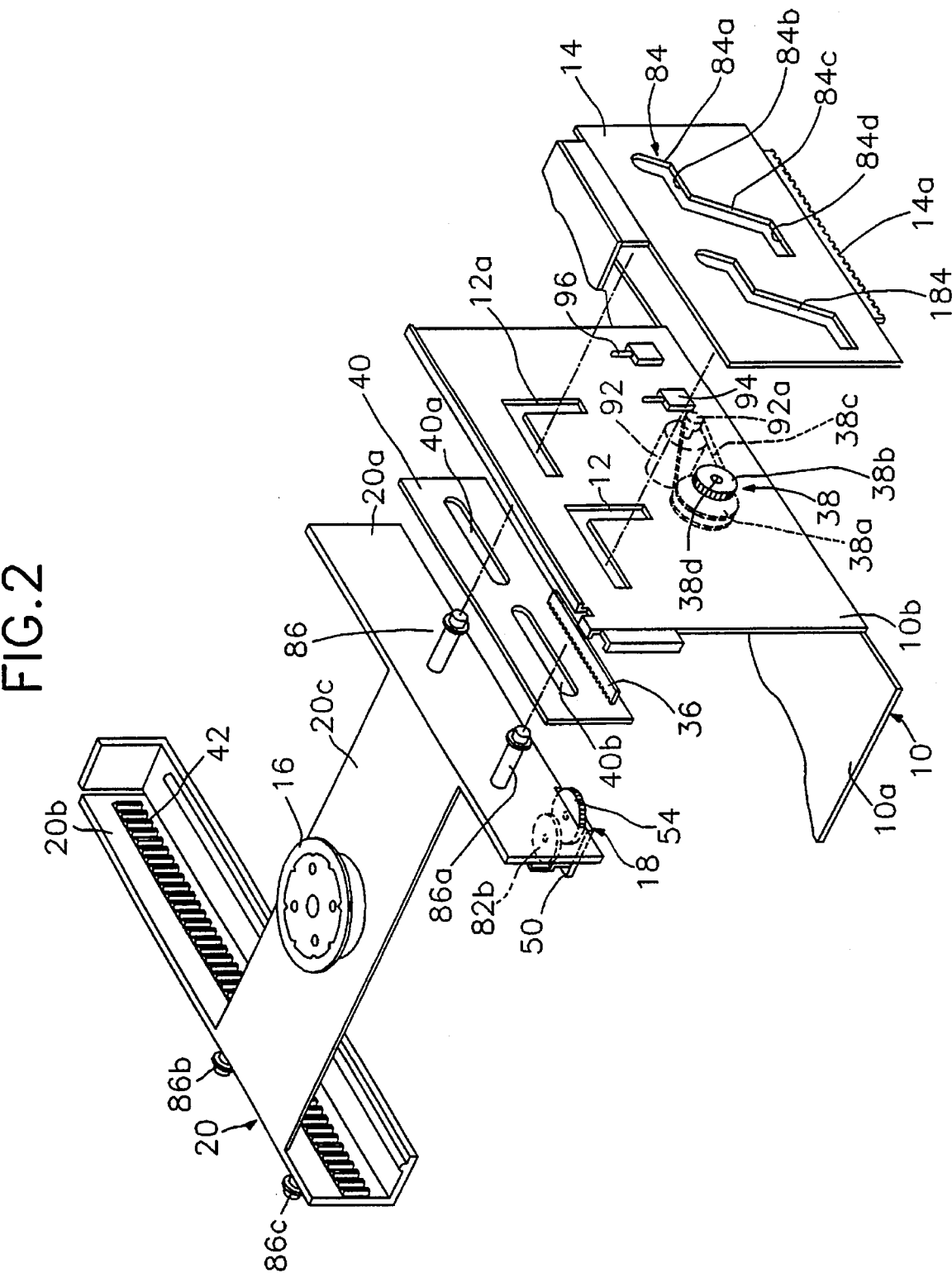
FIG. 2 is an exploded perspective view of the tray holder and several components constituting a feeding mechanism for the tray holder.
Figure 3:
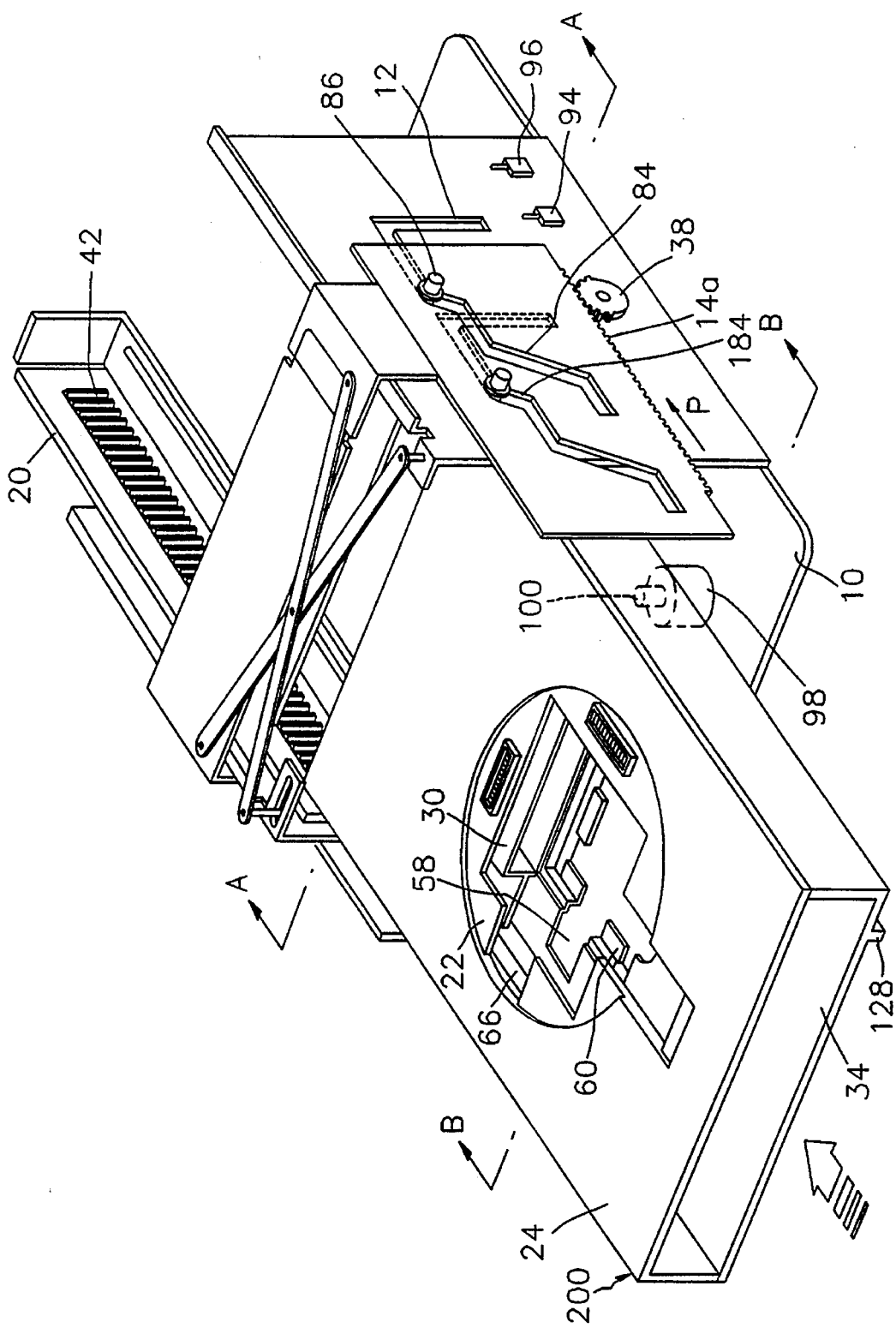
FIG. 3 is a perspective view showing a disc player according to the present invention, in which the components shown in FIGS. 1 and 2 are assembled with each other.

Referring to FIGS. 1 to 3, a base plate 10 has a substantial U-shape and thus has a horizontal bottom plate 10a, a first side wall 10b and a second side wall (not shown), the first and second side walls extending upwardly from both respective side ends of the bottom plate 10a. The first side wall 10b of the base plate 10 is formed with a pair of guide holes 12, 12a each of which is l-shaped. To the base plate 10 is secured a loading means 38 being energized by a micro-computer- (not shown) in order to initiate the loading operation of the compact disc or a minidisc.

The loading means 38 comprises a loading motor 92 having a driving shaft 92a and energized by the microcomputer, a rotating shaft 38d secured to the base plate 10, a pulley 38a fixed to a first end of the rotating shaft 38d, a loading gear 38b fixed to a second end of the rotating shaft 38d, and a belt 38c connecting the driving shaft 92a of the loading motor 92 and the pulley 38a.

The pulley 38a is fixed to one end of the rotating shaft 38d passing through the first side wall 10b and the loading gear 38b is fixed to an opposite end of the rotating shaft 38d. A first limit switch 94 for the minidisc and the second limit switch 96 for a compact disc are secured to an outer surface of the first side wall 10b so as to stop an actuation of the loading motor 95. The loading gear 38b, the first limit switch 94 and the second limit switch 96 are arranged in alignment with each other with respect to a forward and a backward direction.

A moving plate 14 is disposed outside the first side wall 10b of the base plate 10. The moving plate 14 is provided at its bottom with a rack portion 14a which is meshed with the loading gear 38b rotatably secured to the first side wall 10b of the base plate 10, thereby to receive a driving force from the loading means 38. Also, the moving plate 14 is formed with a pair of cam holes 84, 184 which are communicated with the respective guide holes 12, 12a formed in the first side wall 10b when the rack portion 14a of the moving plate 14 is mounted on the loading gear 38b so as to be meshed with it. Each of the cam holes 84, 184 extends downwards in a forward direction, and has a first inclined portion 84a, a first horizontal portion 84b, a second inclined portion 84c and a second horizontal portion 84d, as shown in FIG. 2.

A tray holder 20 is disposed to move in a forward direction and a backward direction between the walls of the base plate 10 and has a first side wall 20a, a second side wall 20b and a cross plate 20c on which a compact disc clamper 16 is mounted.

A pair of guide rods 86, 86a are protruded outwards from the first side wall 20a of the tray holder 20 to consecutively pass through a pair of elongated holes 40a, 40b formed in a power transmitting plate 40 which is interposed between the first side wall 20a of the tray holder 20 and the first side wall 10b of the base plate 10, the guide holes 12, 12a of the base plate 10, and the cam holes 84, 184 of the moving plate 14. Likewise, another pair of guide rods 86b, 86c are protruded outwards from the second side walls 20b of the tray holder 20 to pass through a pair of elongated holes (not shown) of the second side wall of the base plate 10.

On an inwardly-protruding bracket 50 attached to an inner side of the first side wall 20a of the tray holder 20 is rotatably secured a disc tray feeding means 18 comprising, as shown in FIGS. 1, 2, 4A and 4C, a power transmitting gear 54, a lower disc tray feeding gear 82a meshed with the power transmitting gear 54 and an upper disc tray feeding gear 82b integrally formed with the lower disc tray feeding gear 82a. At a pre-determined position of the bracket 50 is installed a limit switch 52 for recognizing a completion of ejection of a combined disc tray 200, and a stopper 154 for touching the limit switch 52 is formed at a rear end of a minidisc tray 34.

A guide rack 42 is formed horizontally on an inner surface of the second side wall 20b of the tray holder 20.

A description as to the combined disc tray 200 will be given hereinafter.

According to the preferred embodiment of the present invention, there is proposed the combined disc tray 200 composed of a compact disc tray 24 and the minidisc tray 34, as shown in FIG. 3.

In FIGS. 1 and 3, the compact disc tray 24 in which a compact disc mount 22 for mounting thereon a compact disc is formed constitutes an upper plate of the combined disc tray 200, and the minidisc tray 34 in which a minidisc mount 26 for mounting thereon a minidisc cartridge is formed constitutes a lower plate of the combined disc tray 200. The compact disc mount 22 and the minidisc mount 26 are vertically aligned with each other. The combined disc tray 200 is arranged such that it can be moved in a forward direction and a backward direction within the tray holder 20.

In FIG. 1, the compact disc mount 22 defines therein an opening 56 through which a minidisc cartridge may pass to be mounted on the minidisc mount 26 and an opening 58 through which a pickup may be fed. A double helical gear 46 is rotatably secured to a shaft 44 fixed to a rear part of the combined disc tray 200 so as to be in mesh with the guide rack 42 of the tray holder 20, thereby to quickly move the combined disc tray 200 along the guide rack 42 when the tray holder 20 moves, as shown in FIGS. 4A and 4B.

The minidisc mount 26 defines therein an opening 26a into which the minidisc cartridge is received and an opening 26b through which the pickup may be fed, and includes a plurality of supports 60 protruding into the opening 26a in order to support the minidisc cartridge mounted thereon.

Figure 4A:
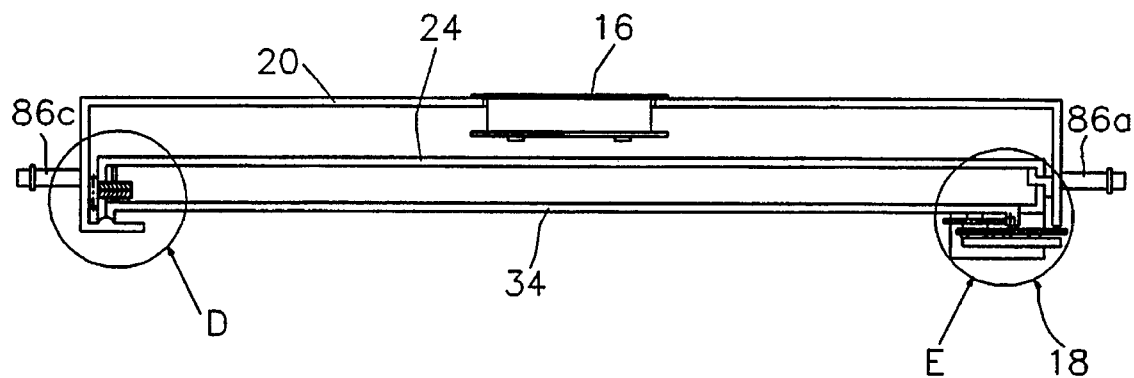
FIG. 4A is a cross-sectional view of FIG. 3, taken along line A—A.
Figure 4B:
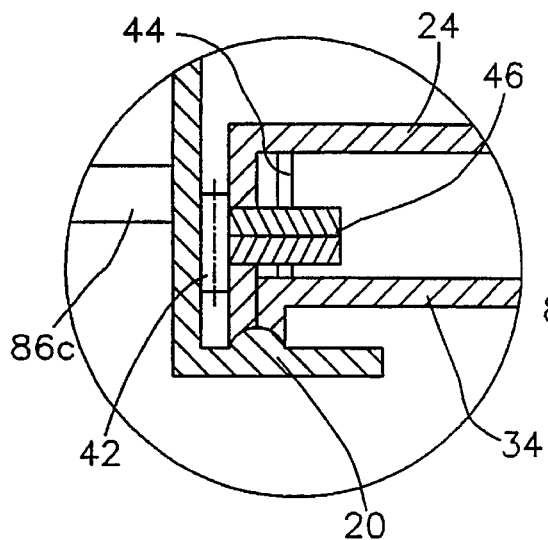
FIG. 4B is an enlarged view of section D of FIG. 4A.
Figure 4C:
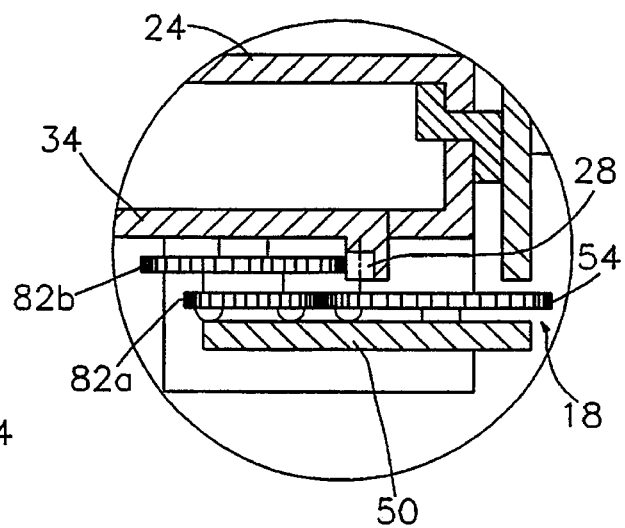
FIG. 4C is an enlarged view of section E of FIG. 4A.

As shown in FIGS. 1, 4A and 4B, the minidisc tray 34 bas at a bottom thereof a longitudinal rib 128 protruding downwards therefrom, and on an inner surface of the rib 128 is formed a rack 28 meshed with the upper disc tray feeding gear 82b such that the combined disc tray 200 including the minidisc tray 34 can receive a feeding force from the upper disc tray feeding gear 82b so as to move in response to a movement of the tray holder 20 by the moving plate 14.

A micro-switch 62 for recognizing a mounting of a minidisc cartridge on the supports 60 of the minidisc mount 26 is installed eta bottom of the minidisc tray 34. A switch actuating piece 64 is springily installed to the micro-switch 62 so as to be pressed towards the micro-switch 62 and touch the micro-switch 62 when the minidisc cartridge is mounted on the supports 60.

Figure 5A:
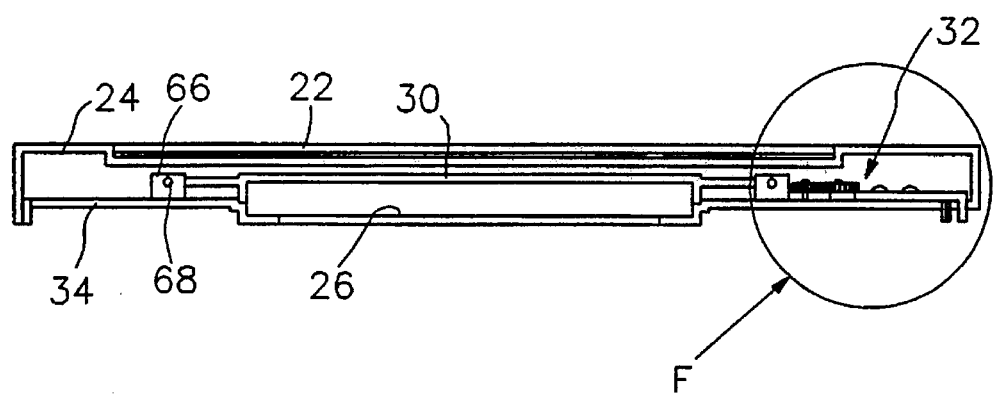
FIG. 5A is a cross-sectional view of FIG. 3, taken along line B—B.
Figure 5B:
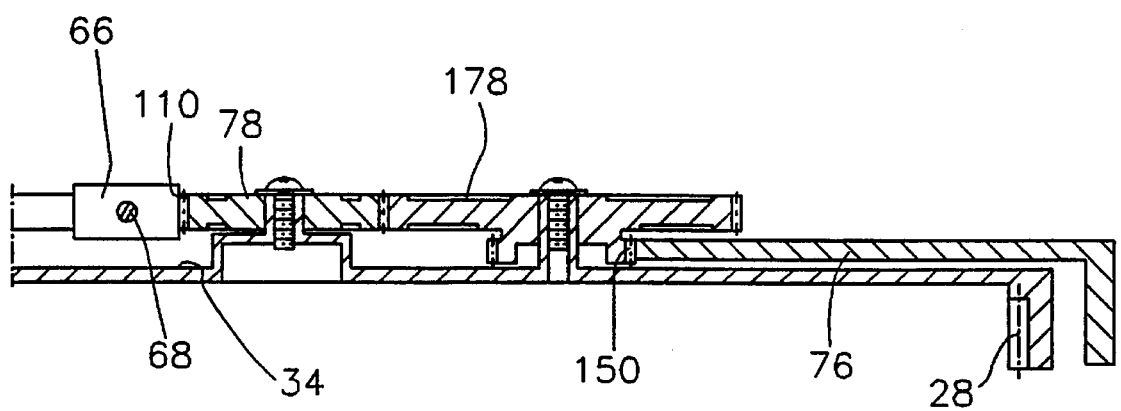
FIG. 5B is an enlarged view of section F of FIG. 5A.

A minidisc cover 30 is arranged to move in a forward and backward a direction above the minidisc tray 34 in such a manner that both side ends of the minidisc cover 30 are attached to a pair of respective sliding members 66, 66a which can slide along respective guide rods 68, 68a secured to the minidisc tray 34, as shown in FIGS. 1, 5A and 5B. A shutter opening pin 70 is provided on an inner side of the minidisc cover 30 so as to open a shutter (not shown) of the minidisc cartridge. On an outer surface of the sliding member 66a is formed a rack gear 110 which is connected to a minidisc cover feeding means 32.

In FIGS. 1, 5A and 5B, the minidisc cover feeding means 32 comprises a cover feeding plate 76 movably arranged on the minidisc tray 34 and formed with a plurality of guide holes 17: into which is inserted each of a plurality of guide protrusions 72 which are secured to the minidisc tray 34, a first cover feeding gear 78 meshed with the rack gear 110 of the sliding member 66a and a second cover feeding gear 178 meshed with the first cover feeding gear 78. The first and second cover feeding gears 78, 178 are rotatably secured to the minidisc tray 34.

The cover feeding plate 76 is secured at its rear end to an elastic member such as spring 74 which is fastened to the minidisc tray 34 and is formed at its side end with a rack gear portion 150 meshed with a lower part of the second cover feeding gear 178, as shown in FIGS. 1, 5A and The power transmitting plate 40 disposed between the first side wall 20a of the tray holder 20 and the first side wall 10b of the base plate 10 has at a bottom part thereof a feeding rack 36 being engaged with the power transmitting gear 54 of the disc tray feeding means 18 so as to furnish the disc tray feeding means 18 with a rotary force which causes the combined disc tray 200 to move in a forward and a backward direction.

Figure 7:
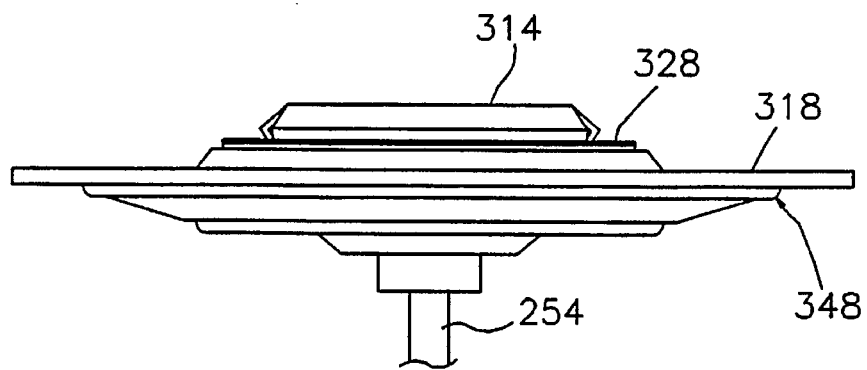
FIG. 7 is a side elevational view of a turntable applied to the present invention.

FIG. 7 shows a single spindle assembly of a turntable on which a compact disc and a minidisc can be loaded in an alternative manner having a minidisc loading body 314 for loading a minidisc cartridge thereon, and a compact disc loading body 348 disposed under the minidisc loading body 14 to load a compact disc thereon.

The minidisc loading body 314 is provided at its lower part with a minidisc loading surface 328 for loading a minidisc thereon. The compact loading body 348 has at its upper part a compact disc loading surface 318 for loading a compact disc thereon. The minidisc loading body 14 has a smaller diameter than that of the compact disc loading body 348. Both the minidisc loading body 314 and compact disc loading body 348 are fixed to a common spindle shaft 254.

Figure 6A:
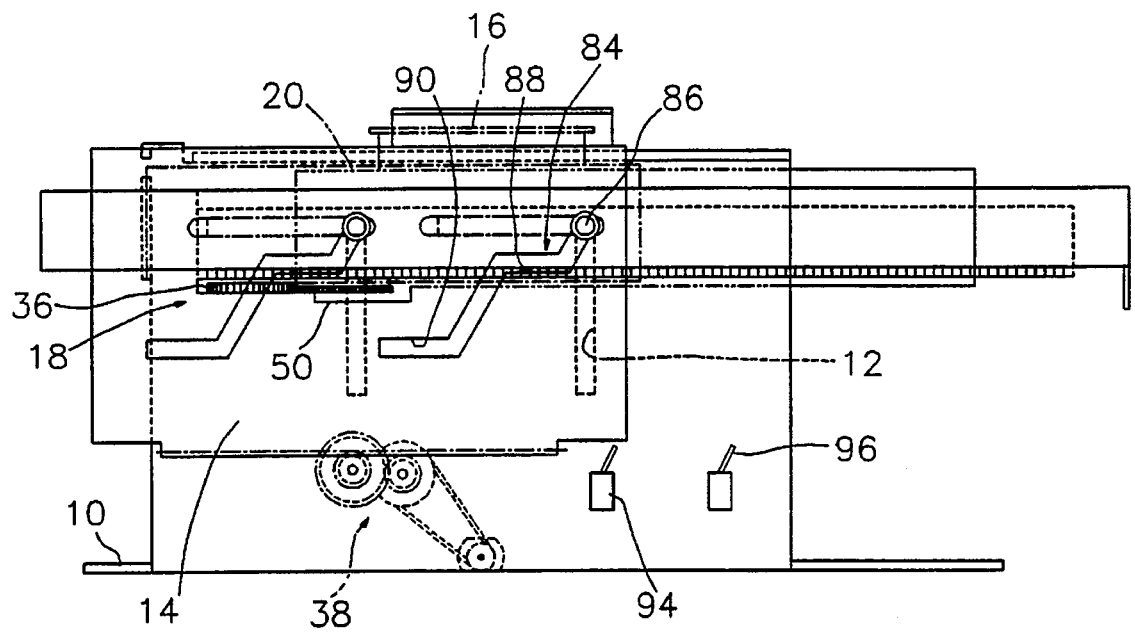
FIG. 6A is a side elevational view showing that the tray holder reaches a pre-loading position of a cam hole.

Hereinafter, an operation of the disc player for selectively reproducing both a minidisc and a compact disc according to the present invention will be described as follows:

When a minidisc is to be reproduced, a minidisc cartridge is mounted on the minidisc mount 26 of minidisc tray 34 through the opening 56 of the compact disc mount 22 of the combined disc tray 200, and then the combined disc tray 200 is pushed into the tray holder 20, as shown in FIG. 3, to energize the loading motor 92 driver by the micro-computer and drive the loading means 38, thereby to move the moving plate 14 in a backward direction as indicated by an arrow P. Due to the backward movement of the moving plate 14, the tray holder 20 connected to the moving plate 14 through the holes 40a, 40b of the power transmitting plate 40 and the guide holes 12, 12a of the base plate 10 by means of the guide rods 86, 86a is also moved in a backward direction so that the guide rods 86, 86a reach at a pre-loading position and thus is positioned at the first inclined portion 84a of the respective cam holes 84, 184, as shown in FIG. 6A. At this time, the actuating rod 100 moves upwards from the solenoid 98 secured to the base plate 10, thereby to hold the feeding plate 76 of the minidisc tray 34. Accordingly, the feeding plate 76 is stopped by the actuating rod 100, and as the combined disc tray 200 moves further in a backward direction the feeding plate 76 has a relative movement towards a forward direction with respect to the minidisc tray 34, whereby the second cover feeding gear 178 rotates so as to feed the minidisc cover 30 in a forward direction.

By this movement of the minidisc cover 30, the shutter of a minidisc cartridge is opened by the shutter opening pin 70.

Figure 6B:
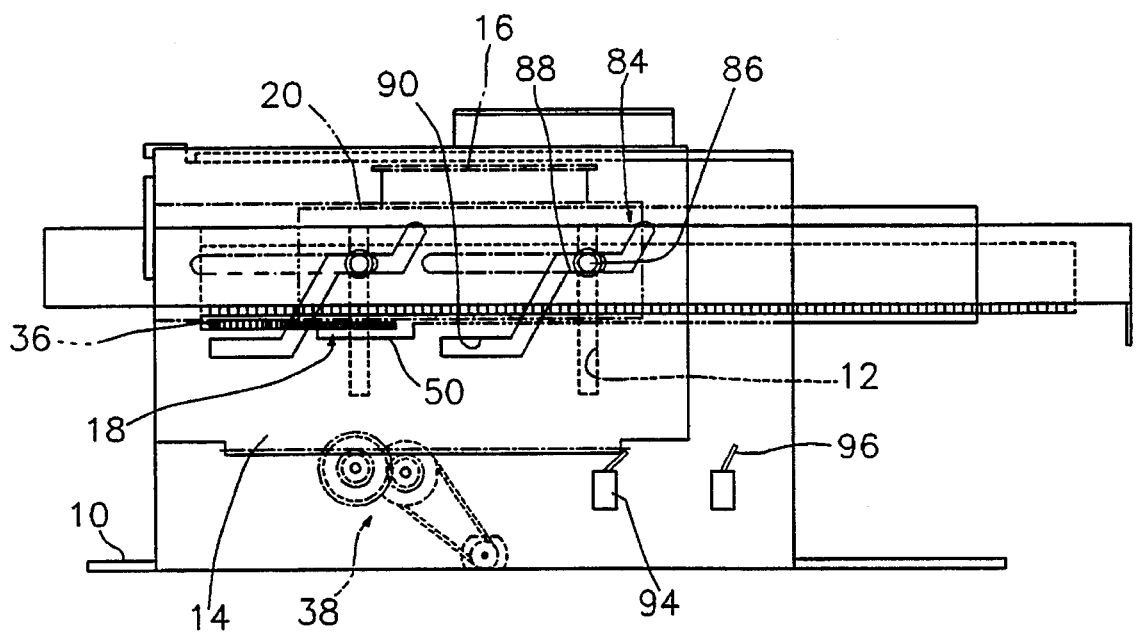
FIG. 6B is a side elevational view showing that the tray holder is positioned at a minidisc-loading position when reproducing a minidisc.

If the moving plate 14 moves further backwards from the above-mentioned pre-loading position, the guide rods 86, 86a are positioned at the first horizontal portion 84b of the cam hole 84, as shown in FIG. 6B, thereby to complete the loading of a minidisc cartridge on the minidisc loading surface 328 formed on the upper part of the turntable.

At this time, the limit switch 94 for minidisc is touched by the rear edge of the moving plate 14 to stop the loading motor 92 and then a reproducing operation is performed.

Figure 6C:
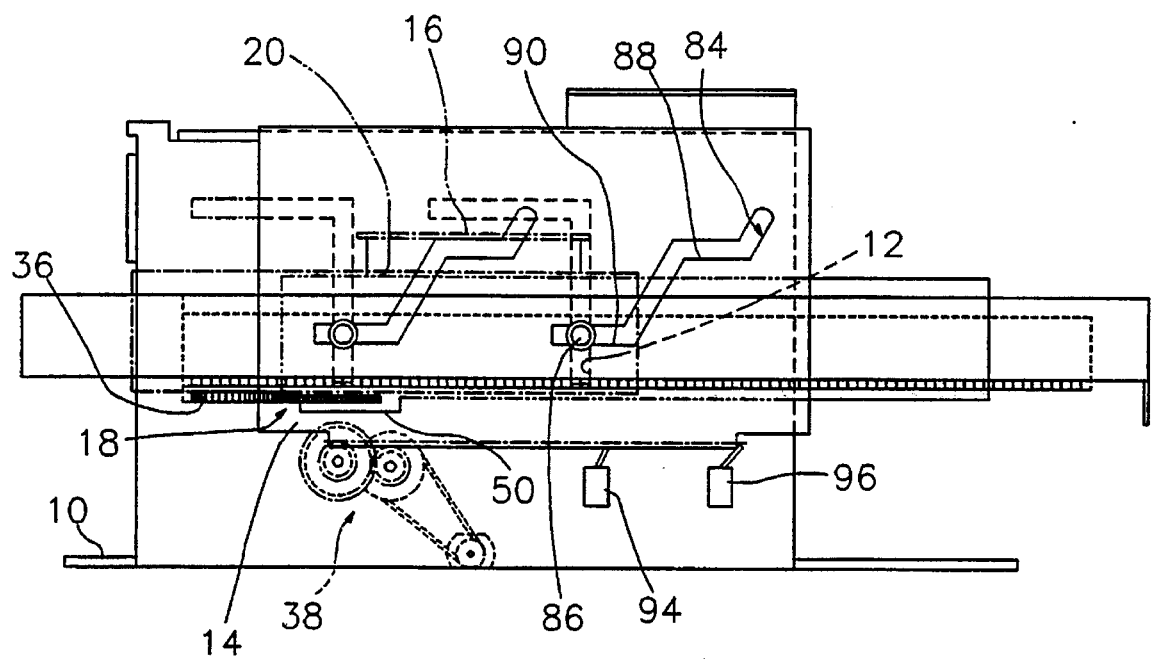
FIG. 6C is a side elevational view showing that the tray holder is positioned at a compact disc-loading position when reproducing a compact disc.

In the meantime, when a compact disc is to be reproduced, the compact disc is mounted on the compact disc mount 22 of the compact disc tray 24 and then the combined disc tray 200 including the compact disc tray 24 is pushed into the tray holder 20 to move the moving plate 14 backwards, like the minidisc loading mentioned above. Then, the guide rods 86, 86a are positioned at the second horizontal portion 84d of the cam hole 84, as shown in FIG. 6C, thereby to complete the loading of the compact disc on the compact disc loading surface 318 formed on the lower part of the turntable. At this time, the limit switch 94 for minidisc does not operate by means of the micro-computer whereas the limit switch 96 for a compact disc is touched by a rear edge of the moving plate 14 to stop the loading motor 92. Thereafter, a reproducing operation is performed.

Also, during the movement of the combined disc tray 200, the double helical gear 46 is meshed with the guide rack 42 formed on the inner surface of the second side wall 20b of the tray holder 20 in accordance with the sliding of the guide rods 86, 86a in the cam holes 84, 84a, thereby to quickly move the combined disc tray 200 within the tray holder 20.

As described above, since the disc player according to the invention is capable of selectively reproducing both a compact disc and a minidisc by using a single pickup device and a single spindle assembly, the construction can be simplified, and it is possible to make the disc player small, thin and compact.

Further, the combined disc tray composed of the compact disc tray and the minidisc tray can be moved fast within the tray holder by means of the double helical gear and the guide rack of the tray holder.

The present invention was described in the above based on the preferred embodiment, and the present invention is not limited to the preferred embodiment, but various changes and modifications can be added without departing from the scope of the present invention.

What is claimed is:

1. A disc player for reproducing both a minidisc and a compact disc, comprising:

a base plate having a horizontal bottom plate, a first side wall and a second side wall, the walls extending upwardly from both respective side ends of the bottom plate;

loading means secured to the base plate for loading one of a minidisc and a compact disc;

a tray holder movably disposed between the walls of the base plate;

a moving plate engaged with the loading means so as to move the tray holder in a loading direction and an electing direction of the disc;

a combined disc tray composed of a compact disk tray and a minidisc tray and movably disposed between the walls of the base plate, the compact disc tray and minidisc tray being arranged vertically apart from each other;

disc tray feeding means for feeding the combined disc tray in a loading direction and an electing direction of the disc, the disc tray feeding means being secured to the tray holder;

a power transmitting plate engaged with the disc tray feeding means;

a single spindle assembly having a turntable on which a compact disc and a minidisc can be selectively loaded; and a pair of guide rods secured to the minidisc tray a minidisc cover movably engaged on the minidisc tray in such a manner that both side ends of the minidisc cover are attached to a pair of respective sliding members which slide along said guide rods, one of the sliding members being formed with a rack gear.

2. The disc player according to claim 1, further comprising a minidisc cover feeding means including a cover feeding plate movably arranged on the minidisc tray and formed with a plurality of guide holes, a first cover feeding gear meshed with the rack gear of the sliding member of the minidisc cover, and a second cover feeding gear meshed with the first cover feeding gear.

3. The disc player according to claim 2, wherein the power transmitting plate is disposed between the tray holder and the base plate, and has a plurality of elongated holes and a feeding rack engaged with the power transmitting gear of the disc tray feeding means, thereby to cause the combined disc tray to move in a forward and a backward direction.

4. The disc player according to claim 3, wherein the tray holder has a first side wall, a second side wall and a cross plate on which a compact disc clamper is mounted, the first side wall being provided with a plurality of guide rods protruding outwards therefrom, the plurality of the guide rods consecutively passing through the plurality of the elongated holes of the power transmitting plate, the guide holes of the base plate and the cam holes of the moving plate.

5. The disc player according to claim 4, wherein the spindle assembly has a minidisc loading body for loading a minidisc cartridge thereon, and a compact disc loading body disposed under the minidisc loading body to load a compact disc thereon, the minidisc loading body having a smaller diameter than that of the compact disc loading body.

6. The disc player according to claim 5, further comprising a micro-switch for recognizing a mounting of a minidisc cartridge on the supports of the minidisc mount, the micro-switch being installed at a bottom of the minidisc tray, and a switch actuating piece springily installed to the micro-switch so as to be pressed towards the micro-switch and touch the micro-switch when a minidisc cartridge is mounted on the supports.

7. The disc player according to claim 6, further comprising a first limit switch for a minidisc and a second limit switch for a compact disc so as to stop an actuation of the loading motor of the loading means, wherein the loading gear of the loading means, the first limit switch end the second limit switch are arranged in alignment with each other with respect to a forward and a backward direction.

8. The disc player according to claim 1, further comprising means for feeding the combined disc tray, the means for feeding the combined disc tray comprising:

a guide rack formed in a horizontal direction on an inner surface of the tray holder; and a double helical gear rotatably secured to a shaft fixed to the compact disc tray and meshed with the guide rack.

9. The disc player according to claim 1, wherein the base plate has a plurality of guide holes, each of the guide holes being L-shaped.

10. The disc player according to claim 9, wherein a bottom of the moving plate has a rack portion engageable with a loading gear of the loading means, and the bottom is formed with a plurality of cam holes communicating with respective ones of the plurality of guide holes.

11. The disc player according to claim 1, wherein the loading means comprises:

a loading motor energized by a micro-computer, the loading motor including a drive shaft;

a rotating shaft secured to the base plate;

a pulley fixed to a first end of the rotating shaft;

a loading gear fixed to a second end of the rotating shaft; and a belt connecting the drive shaft of the loading motor and the pulley.

12. The disc player according to claim 1, wherein the disc tray feeding means comprises:

a power transmitting gear;

a lower disc tray feeding gear meshed with the power transmitting gear; and an upper disc tray feeding gear integrally formed with the lower disc tray feeding gear.

13. The disc player according to claim 1, wherein the compact disc tray defines an upper plate of the combined disc tray and forms a compact disc mount therein, and the minidisc tray defines a lower plate of the combined disc tray and forms a minidisc mount therein, the compact disc mount and minidisc mount being vertically aligned with each other.

14. The disc player according to claim 13, wherein the compact disc mount defines an opening through which a minidisc cartridge may pass, and further defines an opening through which a pickup device may be fed to an interior of the compact disc mount.

15. The disc player according to claim 13, wherein the minidisc mount defines a first opening into which a minidisc cartridge is received and a second opening through which a pickup device may be fed in an interior of the minidisc mount, the minidisc mount having a plurality of supports protruding into the first opening in order to support the minidisc cartridge mounted thereon.

16. The disc player according to claim 13, wherein the minidisc tray has a downwardly protruding longitudinal rib, the longitudinal rib being formed on an inner surface with a rack meshed with an upper disc tray feeding gear.

* * * * *